United States Patent
Shaffer et al.

(10) Patent No.: US 8,199,184 B2
(45) Date of Patent: Jun. 12, 2012

(54) VISUALLY ENHANCING A CONFERENCE

(75) Inventors: Shmuel Shaffer, Palo Alto, CA (US); Mukul Jain, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1253 days.

(21) Appl. No.: 11/935,470

(22) Filed: Nov. 6, 2007

(65) Prior Publication Data

US 2009/0115835 A1 May 7, 2009

(51) Int. Cl.
*H04N 7/14* (2006.01)
(52) U.S. Cl. .................... 348/14.08; 348/14.01
(58) Field of Classification Search ............ 348/14.01, 348/14.03, 14.07, 14.08; 370/259, 260; 358/1.15, 358/1.18; 709/204
See application file for complete search history.

(56) References Cited

U.S. PATENT DOCUMENTS

| | | | | |
|---|---|---|---|---|
| 5,359,675 A | 10/1994 | Siwoff | ............................ | 382/54 |
| 5,377,024 A | 12/1994 | Dillinger | ...................... | 358/502 |
| 5,443,076 A * | 8/1995 | Bau | ............................. | 600/544 |
| 5,473,446 A | 12/1995 | Perumal, Jr. et al. | ......... | 358/523 |
| 5,475,835 A | 12/1995 | Hickey | ......................... | 395/600 |
| 5,510,910 A | 4/1996 | Bockman et al. | ............. | 358/502 |
| 5,537,228 A | 7/1996 | Dillinger | ...................... | 358/502 |
| 5,589,898 A | 12/1996 | Atkinson | ...................... | 351/237 |
| 5,657,137 A | 8/1997 | Perumal, Jr. et al. | ......... | 358/502 |
| 5,677,741 A | 10/1997 | Yui | ............................... | 348/649 |
| 5,684,563 A | 11/1997 | White | ............................. | 355/32 |
| 5,742,296 A | 4/1998 | Yamada et al. | ............... | 345/431 |
| 5,883,632 A | 3/1999 | Dillinger | ...................... | 345/431 |
| 5,917,994 A | 6/1999 | Perumal, Jr. et al. | ......... | 395/109 |
| 5,933,252 A | 8/1999 | Emori et al. | ................... | 358/500 |
| 5,986,642 A | 11/1999 | Ueda et al. | ..................... | 345/150 |
| 5,991,511 A | 11/1999 | Granger | ........................ | 395/109 |
| 6,128,022 A | 10/2000 | Dillinger | ...................... | 345/431 |
| 6,211,971 B1 | 4/2001 | Specht | .......................... | 358/1.9 |
| 6,360,008 B1 | 3/2002 | Suzuki et al. | ................. | 382/167 |
| 6,421,142 B1 | 7/2002 | Lin et al. | ........................ | 358/1.9 |
| 6,738,151 B1 | 5/2004 | Kato | ............................. | 358/1.12 |
| 6,744,544 B1 | 6/2004 | Nagashima et al. | .......... | 358/518 |
| 6,771,314 B1 | 8/2004 | Bawolek et al. | .............. | 348/272 |
| 6,822,760 B1 | 11/2004 | Spaulding et al. | ............. | 358/1.9 |
| 6,870,523 B1 | 3/2005 | Ben-David et al. | ............. | 345/84 |
| 6,985,524 B1 | 1/2006 | Borchers | ....................... | 375/240 |

(Continued)

FOREIGN PATENT DOCUMENTS

EP 0 523 898 A1 7/1992

(Continued)

OTHER PUBLICATIONS

Hikaru Nakahara, WhatColor, *What is "What Color"? 2 pages, downloaded from http:/www.hikarun.com/e/11/5/2007.

(Continued)

*Primary Examiner* — Tuan Nguyen
(74) *Attorney, Agent, or Firm* — Baker Botts L.L.P.

(57) ABSTRACT

A method for visually enhancing a conference includes receiving a first request to enhance a first object. The method also includes establishing a visual conference between at least a local participant and a remote participant. The method additionally includes receiving a visual communication and detecting a reference to the first object in the visual communication. The method further includes, upon detecting the reference to the first object in the visual communication, enhancing for presentation the first object in the visual communication based on the first request.

19 Claims, 2 Drawing Sheets

U.S. PATENT DOCUMENTS

| | | |
|---|---|---|
| 6,999,617 B1 | 2/2006 | Ohga ............................ 382/167 |
| 7,173,736 B2 | 2/2007 | Yamada ......................... 358/1.9 |
| 2001/0017627 A1 | 8/2001 | Marsden et al. ............... 345/501 |
| 2002/0060688 A1 | 5/2002 | Mizumoto ..................... 345/591 |
| 2003/0048464 A1 | 3/2003 | Yamada et al. ................. 358/1.9 |
| 2003/0161530 A1 | 8/2003 | Yamada et al. ............... 382/167 |
| 2003/0185437 A1 | 10/2003 | Nakami ........................ 382/162 |
| 2003/0202194 A1 | 10/2003 | Torigoe et al. ................. 358/1.9 |

FOREIGN PATENT DOCUMENTS

| | | |
|---|---|---|
| EP | 0 569 206 A2 | 4/1993 |
| EP | 0 739 126 A2 | 4/1993 |
| EP | 0 665 674 A3 | 1/1995 |
| EP | 0 665 682 A2 | 1/1995 |
| EP | 0 675 638 A2 | 3/1995 |
| WO | WO 92/05556 | 4/1992 |
| WO | WO 01/17233 A1 | 3/2001 |

OTHER PUBLICATIONS

Solarchromic, with the World's Most Advanced Sunglass Technology!, 2 pages, downloaded from http://www.solarchromic.com/index.html11/5/2007.

\* cited by examiner

US 8,199,184 B2

VISUALLY ENHANCING A CONFERENCE

TECHNICAL FIELD

This disclosure relates generally to visually enhancing a conference.

BACKGROUND

Color vision deficiency affects about 5% to 8% of men and 0.5% of women worldwide. It is a genetic vision impairment comprising several different kinds and degrees of color vision deficiencies. For example, protanomaly (a.k.a. "red-weakness") is one type of vision deficiency. Any redness seen in a color by a normal observer is seen more weakly by the protanomalous viewer. This may cause red, orange, yellow, yellow-green, and green to appear somewhat shifted in hue towards green, and all appear paler than they do to the normal observer. Deuteranomalous (a.k.a. "green-weakness") is another type of color vision deficiency. It is characterized by a difficulty in discriminating small differences in hues in the red, orange, yellow, green region of the spectrum; they appear somewhat shifted towards red. One difference between deuteranomalous individuals and protanomalous individuals is deuteranomalous individuals do not have a loss of "brightness" problem that protanomalous individuals may have. Dichromasy is yet another color vision deficiency in which the individual may not be able to see a perceptible difference between red, orange, yellow, and green; all these colors appear to be the same color.

There are many methods available for groups of individuals to engage in conferencing. One common method, videoconferencing, involves one or more individuals located at one location engaging in a video conference with one or more individuals located at one or more other locations. Videoconferencing involves the use of video equipment, such as cameras and displays, which present the remote users with video imagery (often in color) of the local users. Just as color vision deficiencies can present individuals with difficulties in real life, they can also present challenges in viewing and participating in a video conference.

Some solutions, not directed to visually enhancing a video conference, include the use of tinted lenses in prescription eye glasses. These may help aid those with red-green deficiencies but they do not help wearers perceive or appreciate colors as do people with normal color vision nor are they able to help individuals with yellow-blue deficiencies or total color vision deficiencies. Another solution involving video relies on adjusting a color of the video to compensate for a particular individuals deficiency. As with the tinted lenses this only provides a limited perception improvement.

BRIEF DESCRIPTION OF THE DRAWINGS

For a more complete understanding of particular embodiments and their features and advantages, reference is now made to the following description, taken in conjunction with the accompanying drawings, in which.

DESCRIPTION OF EXAMPLE EMBODIMENTS

Overview

According to particular embodiments, a method for visually enhancing a conference includes receiving a first request to enhance a first object. The method also includes establishing a visual conference between at least a local participant and a remote participant. The method additionally includes receiving a visual communication and detecting a reference to the first object in the visual communication. The method further includes, upon detecting the reference to the first object in the visual communication, enhancing for presentation the first object in the visual communication based on the first request.

Description

Figure 1:
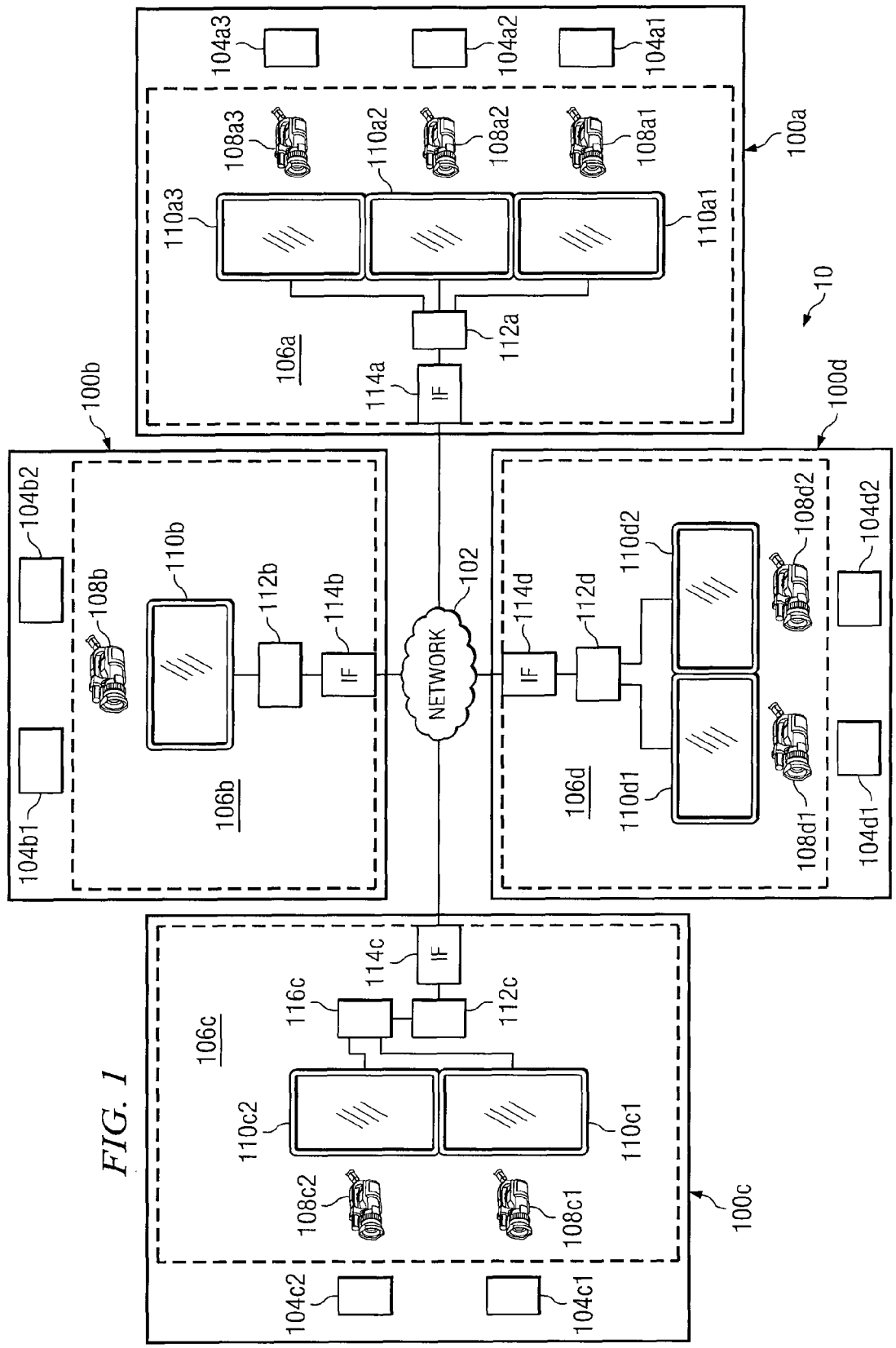
FIG. 1 is a block diagram illustrating a system for visual conferencing between sites, in accordance with some embodiments.
Figure 2:
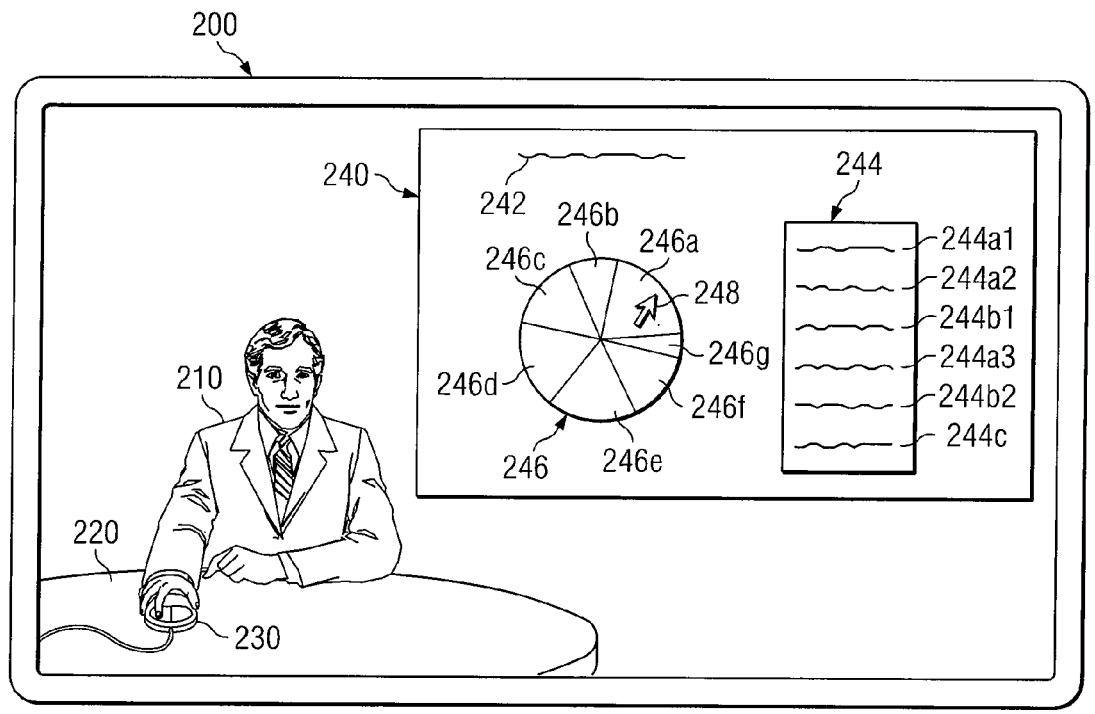
FIG. 2 is a sample display taken during a conference involving a seminar using a multi-colored presentation, in accordance with some embodiments.
Figure 3:
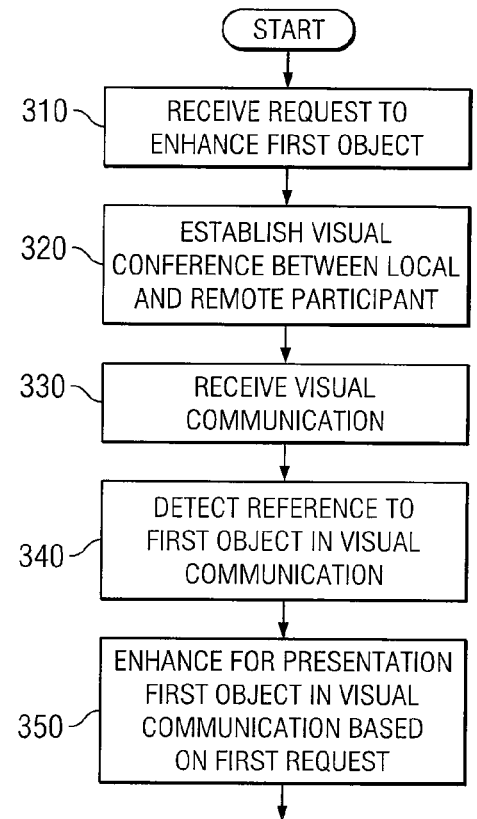
FIG. 3 is a flowchart illustrating a method for visually enhancing a conference, in accordance with some embodiments.

Particular embodiments and their advantages are best understood by referring to FIGS. 1 through 3 of the drawings, like numerals being used for like and corresponding parts of the various drawings. Certain embodiments may provide one or more technical advantages. A technical advantage of particular embodiments may be to provide a conferencing system that may be able to identify and enhance a particular color or range of colors which a color vision deficient person has difficulty perceiving. Accordingly, the color vision deficient person may be able to participate in a visual conference as though they had full color perception. Another advantage of some embodiments may be to allow adapting the enhancement that is used to correspond with the specific type of color deficiency of a user. Accordingly, the same system may be used to aid a variety of users having a wide variety of color vision deficiencies. Yet another advantage of particular embodiments may be to allow static or non-computer images, such as posters or pictures, to be animated. Accordingly, a user may add animation, for example, to a poster that is being used during a video conference without having to have the poster scanned or saved on a computer.

Certain embodiments may include none, some, or all of the above technical advantages. One or more other technical advantages may be readily apparent to one skilled in the art from the figures, descriptions, and claims included herein.

FIG. 1 is a block diagram illustrating a system 10 for visual conferencing between sites 100. The illustrated embodiment includes a network 102 that facilitates a visual conference between remotely located sites 100 using visual conferencing equipment 106. Sites 100 include any suitable number of users 104 participating in the visual conference.

Network 102 may represent communication equipment, including hardware, software and any appropriate controlling logic, for interconnecting elements coupled to network 102 and facilitating communication between sites 100. Network 102 may include a local area network (LAN), a metropolitan area network (MAN), a wide area network (WAN), any other public or private network, a local, regional, or global communication network, an enterprise intranet, other suitable wireline or wireless communication links, or any combination of the preceding. Network 102 may include any combination of gateways, routers, hubs, switches, access points, base stations, and any other hardware, software, or a combination of the preceding that may implement any suitable protocol or communication.

Each user 104 may represent one or more individuals or groups of individuals who are present for the visual conference. Users 104 participate in the visual conference using any suitable devices and/or components, such as audio Internet Protocol (IP) phones, video phone appliances, personal computer (PC) based video phones, and streaming clients. During the visual conference, users 104 engage in the session as content providers (e.g., speakers or video generators) or as content receptors (e.g., non-speakers, viewers, listeners). As the session progress a user may switch between a content provider, a content receptor and both, depending on the situation.

Visual conferencing equipment 106 may facilitate visual conferencing among users 104. Visual conferencing equipment 106 may include any suitable elements to establish and facilitate the visual conference. For example, visual conferencing equipment 106 may include speakers, microphones, or a speakerphone. In the illustrated embodiment, visual conferencing equipment 106 includes cameras 108, displays 110, a processor 112, and a network interface 114. This equipment may be utilized to provide a user, such as one of users 104, with an enhanced image. In addition, visual conferencing equipment 106c also includes visual enhancer 116c. The image may be enhanced in such a way as to compensate for the user's color vision deficiency or to highlight certain aspects of the displayed image (e.g., a specific colored bar of a bar graph).

Cameras 108 may include any suitable hardware and/or software to facilitate capturing an image of user 104 and providing the image to other users 104. Cameras 108 may capture and transmit the image of user 104 as a video stream. Displays 110 may include any suitable hardware and/or software to facilitate receiving the video stream and displaying the image and/or an enhanced image, from a remote site to a local user 104. For example, displays 110 may include a notebook PC, a computer monitor, a projector and screen, a cathode ray tube (CRT) monitor or TV, a rear projection display, a screen of a video-phone, or a flat panel display. Displays 110 display the image of user 104 using any suitable technology that provides a realistic image, such as high definition, high-power compression hardware, and efficient encoding/decoding standards. Visual conferencing equipment 106 may establish the visual conference session using any suitable technology and/or protocol, such as Session Initiation Protocol (SIP) or H.323. Additionally, visual conferencing equipment 106 may support and be interoperable with other video systems supporting other standards, such as H.261, H.263, and/or H.264.

Processor 112 may control the operation and administration of visual conferencing equipment 106 by processing information, media streams and signals received from any components (e.g., cameras 108 and interface 114) of any of the other sites 100. Processor 112 may include any suitable hardware, software, or both that operate to control and process media streams and/or signals. For example, processor 112 may be a programmable logic device, a microcontroller, a microprocessor, any suitable processing device, or any combination of the preceding. Interface 114 may communicate information and media streams to and receive information and media streams from network 102. Interface 114 may represent any port or connection, real or virtual, including any suitable hardware and/or software that may allow visual conferencing equipment 106 to exchange information and media streams with network 102, other visual conferencing equipment 106, or and/or other elements of system 10.

In an example scenario, users 104a and 104d, at sites 100a and 100d, respectively, participate in a visual conference. Each camera 108a at site 100a generates a video stream that may be conveyed for the duration of the visual conference to one of monitors 110d of site 100d. Thus, a remote user (e.g., user 104a3) may consistently be displayed on the same local monitor (e.g., monitor 110d2) for the duration of a particular visual conference. This may make it easier for local users to identify which remote user is speaking. More specifically, in the embodiment depicted in FIG. 1, camera 108a1 may be configured to stream media to monitor 110d1, camera 108a2 may be configured to stream media to monitor 110d2 and camera 108a3 may be configured to stream media to monitor 110d2. Because both cameras 108a2 and 108a3 have been configured to stream media to monitor 110d2, monitor 110d2 may switch between the video streams from cameras 108a2 and 108a3 based on which user last spoke, which user is currently speaking the loudest, or any other switching algorithm. If users 104b1 and 104b2 were to join the visual conference, the media stream from camera 108b may be configured to stream media to monitor 110d1. Thus, as various users 104 speak during the visual conference, the video stream displayed on each monitor 110 may change. If a user, such as user 104d2, has a color vision deficiency, the video stream may be enhanced prior to being displayed on monitors 110d to help compensate for user 104d2's color vision deficiency. For example, if user 104d2 has difficulty detecting red colors, visual conferencing equipment 106 may enhance any instance of red detected within the image displayed on displays 110.

In particular embodiments, such as at site 100c, visual conferencing equipment 106c may include visual enhancer 116c. Visual enhancer 116c may be used to enhance the image displayed on either local or remote displays 110. More specifically, visual enhancer 116c may enhance the image that is received by interface 114c before displaying it locally on displays 110c; or it may enhance the video stream from local cameras 108 before interface 114c sends it to the other conference participants. In particular embodiments, visual enhancer 116c may receive a video stream from each cameras 108 participating in a particular conference, perform any enhancements to the video stream, and then send the enhanced video stream to the respective displays 110. In some embodiments, visual enhancer 116c may enhance the image differently for different displays 110 during the same conference (e.g., it may enhance red objects for monitors 110d and green objects for monitor 110b). In performing the enhancement of the image, visual enhancer 116c may use its own processor or it may share processor 112c. Similarly, any of the functionality described as being performed by visual enhancer 116c may also be performed by processor 112 without a dedicated visual enhancer. In some embodiments, the functionality described above as being performed by visual enhancer 116c may be performed by any of the different components within system 10. For example, a server attached to network 102 may perform any of the visual enhancements described herein. Similarly, visual enhancer 116c may be located anywhere within system 10, including within network 102. The enhancement functionality may be used by a local user using his own local equipment, or using the equipment of a remote user. In particular embodiments, visual enhancer 116 may process the audio stream in addition to processing the video stream. This processing may comprise assessing the delay to the video stream and then applying essentially the same delay to the audio stream. This may help preserve lip synchronization.

Modifications, additions, or omissions may be made to system 10. For example, system 10 may include any suitable number of sites 100 and may facilitate a visual conference between any suitable number of sites 100. As another example, sites 100 may include any suitable number of cameras 108 and displays 110 to facilitate a visual conference. As yet another example, the visual conference between sites 100 may be point-to-point conferences or multipoint conferences. For point-to-point conferences, the number of displays 110 at local site 100 is greater than the number of cameras 108 at remote site 100. For multipoint conferences, the aggregate number of cameras 108 at remote sites 100 is greater than the number of displays 110 at local site 100. Moreover, the operations of system 10 may be performed by more, fewer, or other components. Additionally, operations of system 10 may be performed using any suitable logic.

FIG. 2 is a sample display taken during a conference involving a seminar using a multi-colored presentation, in accordance with some embodiments. More specifically, display 200 is displaying remote user 210 sitting at table 220 and discussing presentation 240. User 210 is using presentation 240 as part of a seminar he is delivering to several remote users at various remote sites. Presentation 240 includes title 242, list 244, and chart 246. During the course of the seminar user 210 may refer to different items from list 244 or wedges from chart 246. Unfortunately, one or more of the remote users viewing the seminar may have a color vision deficiency hindering their ability to see, distinguish or identify certain colored objects within display 200.

In order to improve the color vision deficient user's experience, the color vision deficient user may provide a visual enhancer, such as visual enhancer 116c of FIG. 1, with information regarding their color vision deficiency. The visual enhancer may then present the color vision deficient user with an enhanced image on their display 200 that may allow them to more fully discern the information/imagery being presented. The visual enhancer may be located locally at the same site as the color deficient user, at the remote site being used by user 210, or anywhere on a communication network coupled to one of the sites.

In some embodiments, the remote user may simply provide the visual enhancer with the type of color vision deficiency they have. For example, a remote user may suffer from deuteranomaly causing them difficulty in discriminating small differences in hues in the red, orange, yellow, green region. This information may be provided when the user joins the seminar or some time prior to joining the seminar, or it may be stored within a personal profile that is associated with the user. This information may be received through any appropriate interface, such as one or more of interfaces 114 described above with respect to FIG. 1. The visual enhancer's processor may then use this information to determine which colors need to be enhanced and how they need to be enhanced before being presented on display 200. In some instances the user may simply provide the visual enhancer with a list of colors which the user has difficulty identifying. In certain circumstances the user may be presented with a color palette from which the user may select where along the color palette he has difficulty. As before, the visual enhancer's processor may use this input in determining which colors of the image to enhance.

Once the color vision deficiency has been identified and properly configured (e.g., in system 10), whether by name or symptom, it may be desirable to determine the type of enhancement that is to be made. In particular embodiments this may be done with input from the user received via an interface, or autonomously based on logic stored by, for example, the visual enhancer. For example, after the user selects the colors which she has difficulty seeing, she may select how she wants those colors to be enhanced when they are displayed on screen 200. As another example, the visual enhancer may have stored within its memory a database indicating how to enhance certain colors based on the user's color vision deficiency.

The type of enhancements that may be applied to the image displayed on screen 200 may be as varied as the imagination allows. For example, the visual enhancer may cause a particular region to flash if it is the same color as one of the colors for which the user is deficient. In some embodiments the flashing may be between the actual color and a specific alternate color, two specific alternate colors, or black and white. In another example, the visual enhancer may place a border or outline around regions having the same color as the color in which the user is deficient. The border/outline may include a solid line, a flashing line, a dotted line, a dotted line that moves (e.g., giving the appearance of the dotted line marching around the border of the region), a series of icons, symbols, or shapes (instead of dots), or any other demarcation that may be used to identify the region having the color for which the user is deficient. Another example may involve altering the color of a region of the image having a color for which the user is deficient. Yet another example may be for the visual enhancer to shift the colors of the image on screen 200 such that the colors in which the user is weak are deemphasized while the other colors are emphasized. In some embodiments, the system may overlay a pattern within the boundaries surrounding a specific color. For example the red color area may be presented with a dotted pattern.

Once the visual enhancer knows what colors to enhance and how to enhance them, it may start to analyze the video stream feeding display 200 to determine when and where to enhance the image. In some embodiments the image may be enhanced whenever the color to be enhanced appears. For example, if wedge 246a and items 244a1-244a3 are red, and the user has difficulty distinguishing red tones, then wedge 246a and items 244a1-244a3 may be enhanced before they are displayed on display 200. In certain embodiments, the color to be enhanced may only be enhanced when a reference is made to it. For example, if wedge 246b and items 244b1 and 244b2 are green, and the user has difficulty distinguishing green, then even though wedge 246b and items 244b1 and 244b2 are displayed on display 200, they may not be enhanced until they have been referenced (e.g., someone says "green"). In some embodiments, a reference to a particular color may result in each instance of that color being enhanced. For example, in some embodiments speech recognition may be used so that whenever user 210 (or any other remote or local participant) mentions, for example, green, wedge 246b and items 244b1 and 244b2 are enhanced. Similarly, in some embodiments the image may not only be analyzed to determine what colors are being displayed, but it may also be analyzed to determine if there is any textual mention of a color. For example, assume presentation 240 involved a slide in which the elements are added one-by-one: First, chart 246 and list 244 are displayed; then, a line stating that "Items in Green show a profit" is displayed; next, a line stating that "Items in Yellow show no profit/loss" is displayed; and finally, a line stating that "Items in Red show a loss" is displayed. When display includes only chart 246, list 244 and the first line the visual enhancer's processor may not provide any enhancement. However, when the second line is displayed, the processor may recognize that a reference to "Yellow" has been made, and thus yellow item 244c and wedge 246c may then be enhanced. In particular embodiments, a color may be enhanced if remote user 210 moves cursor 248 over a color which the local user has difficulty distinguishing. For example, if the user has difficulty seeing blue, but has no problem with red, then the image displayed on display 200 may not be enhanced because the cursor is over wedge 248, which is red. However, should the user move cursor 248 to wedge 246*d* (which is blue) then wedge 246*d* may be enhanced.

When and how an image is enhanced may further be refined by allowing control of the range of colors which are enhanced. For example, only exact matches may be enhanced or a range of colors may be enhanced. For example, in some embodiments the local user may use a graphical user interface to specify a range of reds which he has difficulty perceiving. In particular embodiments, the local user may simply enter or select the color or colors he has trouble with, and the visual enhancer may automatically enhance any colors that are within predetermined limits of the color(s) entered by the local user.

Furthermore, in some embodiments the area of display 200 that is enhanced may be limited. For example, the visual enhancer may be configured to only enhance instances of orange that appear within presentation 240. Accordingly, whenever the color orange is to be enhanced (whether because user 210 said "orange" or he moved cursor 248 over an orange wedge 246*f*) only wedge 246*f* may be enhanced, even if user 210 recently went tanning and has an orange complexion. This may be desirable to avoid having irrelevant instances of a color being enhanced (e.g., if user 210 is wearing a red shirt, it may be desirable to have items 244*a*1-244*a*3 and wedge 246*a* enhanced but not user 210's shirt.

In some embodiments, the visual enhancer may be used to enhance the image displayed on display 200 even though none of the conference participants have a visual impairment. This may allow user 210 to provide added emphasis or animation to his presentation. For example, if presentation 240 was a poster board and user 210 wanted to call attention to those items which were profitable (e.g., items 244*b*1 and 244*b*2), user 210 may request that the visual enhancer enhance the green text. Similarly, user 210 may request that the visual enhancer enhance an object if cursor 248 is over the object; in some instances user 210 may further request that the object also be of a certain color, or in a particular area before it is enhanced.

Furthermore, some embodiments may allow different enhancements for different remote sites. This may allow a single visual enhancer to enhance the displays of different users with different color vision deficiencies. This may also be useful when, for example, the user is making a presentation to several different clients, or groups of users, at the same time. For example, the user could animate his presentation with the logo of each company so that the display at each company's site presents the users there with an animation featuring their company's logo.

FIG. 3 is a flowchart illustrating a method for visually enhancing a conference, in accordance with some embodiments. The method begins at step 310 where a request to enhance a first object is received. This request may, for example, be received by any of the interfaces discussed above. The request may be sent by a local user for his own benefit or by a remote user for the benefit of the local user. For example, if a local user has difficulty seeing green, he may request that green objects be enhanced on his display(s). If a remote user wants to enhance his presentation, he may request that objects which he points to with his mouse cursor be enhanced on the display(s) of other users. If a remote user is aware that a local user has difficulty seeing red, the remote user may request that red be enhanced for the display(s) being used by the local user. These three examples illustrate not only who may send the request, and for whose benefit, but they also help to illustrate some of the many different requests that can be made. In general, the user making the request may be able to specify what he wants enhanced (e.g., a specific color or range of colors, a specific item or image such as a particular sentence within a quote being displayed, all or specific items within a particular area, the contents of a file, a slide, a document, or a poster used in a presentation, or any other type or feature or combination of type and/or feature of an object) and when he wants it enhanced (e.g., every instances, when it is referenced, when it appears in a certain area, or any other location, whether general or specific).

In some embodiments the request may be made by the user specifically identifying the first object. For example, the user may specify that the color red is to be enhanced. In particular embodiments the request may be made by the user generally identifying a type of visual impairment, such as deuteranomalous.

At step 320 a visual conference is established between a local and remote user. The local and remote users may merely be a minimum of users, in practice a visual conference may include any number of participants. In establishing the visual conference, the local and remote interfaces may be configured to send/receive communications directly to one another or to an intermediary component (e.g., a visual enhancer operated by a third party service provider who is providing a visual enhancement service to one, or both of the users).

At step 330 a visual communication is received. The visual communication may be a video stream or a static image (e.g., a slide from a presentation). For example, in some scenarios the users may be participating in a visual conference using full video. In some scenarios the users may be participating in a phone conference with visual aids comprising static images (e.g., a slide show). In particular scenarios the visual conference may include both full video and visual aids, in which case the visual communication may comprise both the full video and the visual aids. In many instances an audio communication may also be received. The audio communication may be a part of the visual communication, for example in the case of video, or they may be separate, for example in the case of a phone conference with visual aids.

At step 340 a reference to the first object in the visual communication is detected. How the reference is detected may depend on the capabilities of the components involved in the visual conference and/or the contents of the request to enhance the first object. For example, some components may comprise speech recognition capabilities. Thus, a reference may be detected if a certain user(s) (or any user, depending on the contents of the request) says any word(s) that the processor of the visual enhancer determines is indicative of the first object. For example, if the local user indicates in his request that he has difficulty seeing red, then, upon a remote user saying "red" the visual enhancer may detect a reference to the first object. As another example, some components may be able to determine the location of a cursor. Thus, a reference to the first object may be made by placing the cursor over the first object. For example, if the first object is a chart, anytime the cursor is placed over the chart a reference is detected. Some equipment may simply assume that the visual communication is itself the reference to the first object. In other words, any time the first object appears in the visual communication a reference to the first object is detected. For example, for a user who has difficulty seeing green, anytime a green object is displayed, a reference to the first object is detected.

At step 350 the first object in the visual communication is enhanced for presentation based on the first request. In some cases the user may have been able to specify in his request how the visual enhancer is to enhance the first object. For example the user may request that the visual enhancer alternates the color of the first object back and forth between two or more colors (e.g., black and white, or the original color of the object and a different color), changes the color of the first object, creates an outline around the first object, causes the first object to appear to move within the visual element (e.g., the first object may appear to vibrate or enlarge/reduce in size), or otherwise causes the first object to stand out from the remainder of the visual element. In certain instances the visual enhancer may add specific patterns (e.g., dots or checkers) to the first object. In some cases, the visual enhancer may automatically choose the type of enhancement to use based on the user's visual impairment and/or the surrounding colors. For example, if the user has difficulty seeing yellow, and a yellow object appears on a blue background, the visual enhancer may not change the color of the yellow object to blue because then it would blend into the background. In some embodiments, the visual conference may be enhanced differently for different users at different sites. This provides flexibility in not only allowing a visual conference to be viewed by different users having different color vision deficiencies, but also allows a user to give the same presentation with different users at different sites having different experiences (e.g., the company logo example from above).

Modifications, additions, or omissions may be made to the method depicted in FIG. 3. The flowchart may include more, fewer, or other steps. Additionally, steps may be performed in any suitable order and by any suitable component. For example, the request to enhance a first object may be received after the visual conference has begun.

Although several embodiments have been described, a myriad of changes, variations, alterations, transformations, and modifications may be suggested to one skilled in the art, and it is intended that the some embodiments encompass such changes, variations, alterations, transformations, and modifications as falling within the scope of the appended claims.

What is claimed is:

1. A method comprising:
   receiving a first request to enhance a first object;
   establishing a visual conference between at least a local participant and a remote participant;
   receiving a visual communication;
   detecting a reference to the first object in the visual communication; and
   upon detecting the reference to the first object in the visual communication, enhancing for presentation the first object in the visual communication based on the first request.

2. The method of claim 1, wherein receiving a first request to enhance a first object comprises receiving a first request to enhance a first color.

3. The method of claim 2, wherein receiving a first request to enhance a first color comprises receiving an indication of a participant's visual impairment.

4. The method of claim 1, wherein detecting the reference to the first object in the visual communication comprises:
   receiving an audio communication comprising at least one spoken word;
   analyzing the audio communication using speech recognition; and
   matching the at least one spoken word to information in the first request.

5. The method of claim 1, wherein detecting the reference to the first object in the visual communication comprises:
   receiving cursor data comprising information indicative of the location of a cursor within the visual element; and
   matching the information indicative of the location of the cursor within the visual element to information in the first request.

6. The method of claim 1, wherein the first object is selected from the group consisting of an image, a file, a slide of a presentation, a word, a plurality of words, a chart, and a shape.

7. The method of claim 1, wherein enhancing for presentation the first object in the visual communication based on the first request comprises applying an animation selected form the group consisting of alternating the color of the first object between a second color and a third color, changing the color of the first object, creating an outline around the first object, and causing the first object to stand out from the remainder of the visual element.

8. The method of claim 1, wherein enhancing for presentation the first object in the visual communication based on the first request comprises applying a pattern to the first object.

9. The method of claim 1, further comprising:
   receiving an audio communication; and
   delaying the audio communication and the video communication to synchronize the audio communication and the video communication for presentation.

10. A system comprising:
    an interface operable to:
       receive a first request to enhance a first object;
       establish a visual conference between at least a local participant and a remote participant; and
       receive a visual communication; and
    a processor coupled to the interface and operable to:
       detect a reference to the first object in the visual communication; and
       upon detecting the reference to the first object in the visual communication, enhance for presentation the first object in the visual communication based on the first request.

11. The system of claim 10, wherein the interface operable to receive a first request to enhance a first object comprises an interface operable to receive a first request to enhance a first color.

12. The system of claim 11, wherein the interface operable to receive a first request to enhance a first color comprises an interface operable to receive an indication of a participant's visual impairment.

13. The system of claim 10, wherein the processor operable to detect the reference to the first object in the visual communication comprises a processor operable to:
    receive an audio communication comprising at least one spoken word; and
    analyze the audio communication using speech recognition; and
    match the at least one spoken word to information in the first request.

14. The system of claim 10, wherein the processor operable to detect the reference to the first object in the visual communication comprises a processor operable to:
    receive cursor data comprising information indicative of the location of a cursor within the visual element; and
    match the information indicative of the location of the cursor within the visual element to information in the first request.

15. The system of claim 10, wherein the first object is selected from the group consisting of an image, a file, a slide of a presentation, a word, a plurality of words, a chart, and a shape.

16. The system of claim 10, wherein the processor operable to enhance for presentation the first object in the visual communication based on the first request comprises a processor operable to apply an animation selected form the group consisting of alternating the color of the first object between a second color and a third color, changing the color of the first object, creating an outline around the first object, and causing the first object to stand out from the remainder of the visual element.

17. The system of claim 10, wherein the processor operable to enhance for presentation the first object in the visual communication based on the first request comprises a processor operable to apply a pattern to the first object.

18. The system of claim 10, wherein the interface is further operable to:
   receive an audio communication; and
   delay the audio communication and the video communication to synchronize the audio communication and the video communication for presentation.

19. A system for visually enhancing a conference, comprising:
   means for receiving a first request to enhance a first object;
   means for establishing a visual conference between at least a local participant and a remote participant;
   means for receiving a visual communication;
   means for detecting a reference to the first object in the visual communication; and
   means for upon detecting the reference to the first object in the visual communication, enhancing for presentation the first object in the visual communication based on the first request.

* * * * *